US006463105B1

(12) United States Patent
Ramesh (10) Patent No.: US 6,463,105 B1
(45) Date of Patent: Oct. 8, 2002

(54) METHODS AND SYSTEMS FOR ESTIMATION OF THE CARRIER TO INTERFERENCE RATIO FOR A WIRELESS COMMUNICATION CHANNEL

(75) Inventor: Rajaram Ramesh, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/394,998

(22) Filed: Sep. 13, 1999

(51) Int. Cl.$^7$ .............................. H04L 23/02; H04L 5/12
(52) U.S. Cl. ........................ 375/262; 375/341; 375/346; 370/342; 455/226.1
(58) Field of Search .......................... 455/226.1, 226.2; 370/342; 375/232, 233, 340, 346, 348, 341, 262

(56) References Cited

U.S. PATENT DOCUMENTS

| | | | | |
|---|---|---|---|---|
| 5,537,443 A | | 7/1996 | Yoshino et al. ............. | 375/340 |
| 5,583,886 A | | 12/1996 | Rohani et al. .............. | 375/327 |
| 5,933,768 A | * | 8/1999 | Skold et al. ................ | 455/296 |
| 6,026,130 A | * | 2/2000 | Rahmatullah et al. ...... | 375/340 |
| 6,118,816 A | * | 9/2000 | Meyer et al. ............... | 375/233 |
| 6,118,832 A | * | 9/2000 | Mayrargue et al. ......... | 375/340 |
| 6,249,518 B1 | * | 6/2001 | Cui ............................ | 370/347 |
| 6,263,029 B1 | * | 7/2001 | Alard et al. ................ | 375/340 |
| 6,304,618 B1 | * | 10/2001 | Hafeez et al. .............. | 375/341 |
| 6,327,314 B1 | * | 12/2001 | Cimini, Jr. et al. ......... | 375/340 |

FOREIGN PATENT DOCUMENTS

| | | |
|---|---|---|
| EP | 0 858 181 | 8/1998 |
| WO | WO99 17490 | 4/1999 |

OTHER PUBLICATIONS

Copy of International Search Report for PCT/US00/22852.
J. Zander *Performance of Optimum Transmitter Power Control in Cellular Radio Systems*, IEEE Trans. Veh. Tech., Feb. 1992, pp. 57–62.

M.D. Austin and G. L. Stuber, *In–Service Signal Quality Estimation for TDMA Cellular Systems*, PIMRC' 95, pp. 836–840.

M. Andersin, N.B. Mandayam and R. D. Yates, *Subspace Based Estimation of the Signal to Interference Ratio for TDMA Cellular Systems*, IEEE VTC'96, pp. 1155–1159.

K. Balachandran, S. Kadaba and S. Nanda, *Rate Adaptation Over Mobile Radio Channels Using Channel Quality Information*, IEEE Globe–com '98 Communications Theory Mini Conference Record, pp. 46–52.

Mustafa Turkboylari and Gordon L. Stuber, *An Efficient Algorithm for Estimating the Signal–to–Interference Ration in TDMA Cellular Systems*, IEE Transaction on Communications, vol. 46, No. 6, Jun. 1988.

* cited by examiner

*Primary Examiner*—Daniel Hunter
*Assistant Examiner*—Andrew T Harry
(74) *Attorney, Agent, or Firm*—Myers, Bigel, Sibley & Sajovec (57) ABSTRACT

Methods and systems are provided which calculate a carrier to interference ratio of a channel using an approach which accounts for variations in the channel response characteristics over the estimation evaluation time period. The time variations may be taken into account by various alternative approaches including breaking the sample period into a series of sub-sample estimation windows and applying a different constant channel response estimate to each sub-sample estimation window or by applying a time varying model to the channel when generating the channel response estimate (such as a least squares error fit to a first order or higher order equation). Accordingly, the systems and methods of the present invention may provide for improved estimates of the carrier to interference ratio, particularly for channels subject to multi-path fading effects such as those which may result from movement of a mobile terminal during measurements of the channel.

29 Claims, 5 Drawing Sheets

METHODS AND SYSTEMS FOR ESTIMATION OF THE CARRIER TO INTERFERENCE RATIO FOR A WIRELESS COMMUNICATION CHANNEL

FIELD OF THE INVENTION

This invention relates to communication systems and, more particularly, to characterization of the signal characteristics of a communication channel.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as that designated as IS-54B (and its successor IS-136) in North America and the pan-European GSM system have been introduced. These systems, and others, are described, for example, in the book titled *Cellular Radio Systems* by Balston, et al., published by Artech House, Norwood, Mass., 1993. In addition, satellite based radio communication systems are also being utilized to provide wireless communications in various regions such as the Asian Cellular Satellite System (ACeS) generated by Lockheed Martin Corporation.

Wireless communications systems such as cellular radiotelephone systems typically include a plurality of communication channels which may be established between a first transceiver (such as a base station) and a second transceiver (such as a mobile terminal). The communication channels typically are subject to performance-degrading environmental effects such as multi-path fading and interference or other noise source effects. Interference effects may be caused by interaction of non-orthogonal signals generated in the signal medium by sources other than the source of the desired transmitted signal.

One significant source of interference signals results, in part, from the limited range of radio channels allocated to cellular mobile communications in the United States. The limitations on the number of available frequency bands present several challenges as the number of subscribers increases. Increasing the number of subscribers in a cellular radiotelephone system generally requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time.

For these reasons, conventional cellular systems typically employ frequency reuse to increase potential channel capacity in each cell and increase spectral efficiency. Fixed frequency reuse generally involves allocating frequency bands to each cell, with cells employing the same frequencies geographically separated to allow radiotelephones in different cells to simultaneously use the same frequency without interfering with each other. An alternative approach to fixed frequency reuse is adaptive channel allocation (ACA). In ACA networks, the available channels are typically dynamically allocated throughout the network to maximize system capacity rather than defining a specific subset of the available channels for each cell within the network.

The allocation of a channel within cellular networks to a mobile terminal may be based on measurements made by the mobile terminal and/or the network of channels (or frequencies) which are potential sources of interference signals as well as signal strengths of desired signals to calculate the carrier (or signal) to interference ratios. The interference signal measurements and signal to interference ratio values may, in turn, be used to select a channel for use by the mobile terminal which may provide, for example, acceptable performance at the lowest transmission power level. Studies have shown power control based on carrier to interference ratio provides better results than when based on signal strength as discussed in J. Zander, "Performance of Optimum Transmitter Power Control in Cellular Radio Systems," IEEE Trans. Veh. Tech., February 1992, pp. 57–62.

In a multi-rate system, rate adaptation can be performed, for example, based on carrier to interference ratio measurements. Knowledge of the carrier to interference ratio can also be used to tune algorithms (such as a channel tracker) that can use knowledge of the impairment variance on a channel. Thus, it is desirable to perform carrier to interference measurements in devices such as mobile terminals in a cellular telephone system. Recognizing the benefits of making such measurements, for example, the IS-136 Rev. B. standard includes measurement and reporting procedures for carrier to interference ratio measurements.

Various methods have been proposed to measure interference power which measurements may then be used in generating a carrier to interference ratio for a channel. One such proposed method is the interference projection method. This method essentially works by projecting the received signal onto the null space of a known symbol pattern such as a synchronization pattern. The residual energy present provides the interference power whereas the signal or carrier power can be obtained by averaging the power of the received signal. An example of such an approach is discussed in M. D. Austin and G. L. Stuber, "In-Service Signal Quality Estimation for TDMA Cellular Systems," PIMRC'95, pp. 836–840. The interference projection method is generally considered to provide a poorer performance than various of the other proposed methods.

Another proposed method for measurement is the subspace based method. Under this method, the dimensions of the signal and interference subspaces are typically identified using an eigen-value decomposition of the correlation matrix of the received signal and the corresponding powers give the signal and interference powers. While this method generally gives good performance, it may involve quite complex calculations. An example of a subspace based method is discussed in M. Andersin, N. B. Mandayam and R. D. Yates, "Subspace Based Estimation of the Signal to Interference Ratio for TDMA Cellular Systems," IEEE VTC'96, pp. 1155–1159.

A third approach involves demodulation based methods. In demodulation based methods, the received data is demodulated and the error between a hypothesized signal and the received signal is used to estimate the interference power. This method typically does not work well at low signal to interference ratios due to demodulation errors. While improved performance in demodulation methods can be provided by using decoded and re-encoded data, the problems at low signal to interference ratios still generally remain. An example of a demodulation based method is described in K. Balachandran, S. Kadaba and S. Nanda, "Rate Adaptation Over Mobile Radio Channels Using Channel Quality Information," IEEE Globe-com'98 Communications Theory Mini Conference Record, pp. 46–52.

A further method previously proposed is the signal projection method. Using this method, a best fit channel is typically obtained using the received signal and knowledge of a known or an expected received symbol pattern such as a synchronization sequence. The error in the best fit approximation is appropriately scaled to provide an estimate of the interference power on a per symbol basis. This method generally works as well as the subspace based method at a lower complexity. However, problems may be encountered with the conventional signal projection method on channels subject to high doppler frequencies where the best fit channel varies over the duration of the synchronization word being used for the signal projection analysis. This time variation, in turn, may lead to errors in the interference power measurement using the signal projection method. The primary cause of this error condition in systems such as mobile cellular networks is multi-path fading resulting from movement of the mobile terminal during measurements.

SUMMARY OF THE INVENTION

It is, therefore, an object of the present invention to provide systems and methods which may allow improved estimation of the carrier to interference ratio of a communication channel.

In order to provide for the foregoing and other objectives, a method is provided which calculates a carrier to interference ratio of a channel using an approach which accounts for variations in the channel response characteristics over the estimation evaluation time period. The time variations may be taken into account by various alternative approaches including breaking the sample period into a series of sub-sample estimation windows and applying a different constant channel response estimate to each sub-sample estimation window or by applying a time varying model to the channel when generating the channel response estimate (such as a least squares error fit to a first order or higher order equation). Accordingly, the systems and methods of the present invention may provide for improved estimates of the carrier to interference ratio, particularly for channels subject to multi-path fading effects such as those which may result from movement of a mobile terminal during measurements of the channel.

In one embodiment of the present invention, a method is provided for estimation of interference on a communication channel. A signal is received over the channel over a period of time and the received signal is demodulated to provide an associated plurality of symbol estimates for the period of time. The plurality of symbol estimates is compared to a plurality of associated expected symbols to generate a channel estimate which accounts for variation of the channel over the period of time and an estimate of interference signal strength for the channel is generated using the channel estimate and the signal received over the period of time. The period of time may be within a single received slot. A carrier to interference ration for the channel may be determined using the interference signal strength.

In another embodiment, the comparing step includes the steps of defining a time varying function for the channel estimate, the time varying function including a plurality of coefficients, and estimating each of the plurality of coefficients based on the plurality of symbol estimates and the plurality of associated expected symbols. Furthermore, the steps of receiving, demodulating, comparing and generating may be repeated for a plurality of received slots. The generated interference signal strengths may be accumulated and an average interference signal strength for the channel may be generated from the accumulated interference signal strengths. More particularly, the time varying function may be a linear time varying function of the form $c = c^0 + c^1 t$ for the channel estimate where c is the channel estimate and $c^0$ and $c^1$ are coefficients of the channel estimate.

In a further embodiment of the present invention, the power of the interference signal may be calculated to provide the interference signal strength using a function of the form $$P(I_i) = \frac{1}{z} \sum |r_i - c_i^0 s_i - c_i^1 i s_i|^2$$

where the summation is over the time period and where $I_i$ is the interference signal, $r_i$ is a received signal, $s_i$ is an excepted signal, i is a symbol period and z is a scaling factor. In a further aspect, the period of time may be the synchronization period of the received slot and the plurality of associated expected symbols are a predetermined synchronization sequence. Alternatively, plurality of associated expected symbols may be generated from decoded and then re-coded symbol estimates corresponding to symbol estimates for the period of time.

The calculating step may include scaling the interference signal strength to a per symbol basis and the summation may be performed over the period of time on a symbol rate basis. Furthermore, the channel may be an IS-136 protocol channel in which case the synchronization period is fourteen symbols and the summation in the interference signal strength function is for i=0 to 13. In one embodiment where the channel is subject to time dispersion, the channel estimate could include multiple channel estimates, corresponding to different delayed versions of the signal, each such channel estimate varying with time. For example, the channel estimates could include a first channel estimate associated with the symbol position of the channel estimate and a second channel estimate associated with a symbol position preceding the symbol position of the channel estimate.

In another embodiment of the present invention, the period of time is partitioned into a plurality of estimation windows. A constant channel estimate $c_i$ is generated for each of the plurality of estimation windows. Each of the constant channel estimates is associated with a symbol position in a middle region of the respective estimation window associated with the constant channel estimate. Preferably, each of the plurality of estimation windows overlaps at least one other of the plurality of estimation windows. In one aspect of this embodiment, the channel may be an IS-136 protocol channel and the period of time may be the synchronization period which is fourteen symbols and the summation in the interference signal strength function may be for i=2 to 11 with a sub-synch sequence length of 5. Each of the plurality of estimation windows may be an odd symbol length estimation window having a center symbol position and the each of the constant channel estimates may be associated with the central symbol position in the estimation window associated with the constant channel estimate.

While the invention has been described above primarily with reference to methods, it is to be understood that systems are also provided.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods or devices. Accordingly, the present invention may take the form of a hardware embodiment, a software embodiment or an embodiment combining software and hardware aspects.

Figure 1:
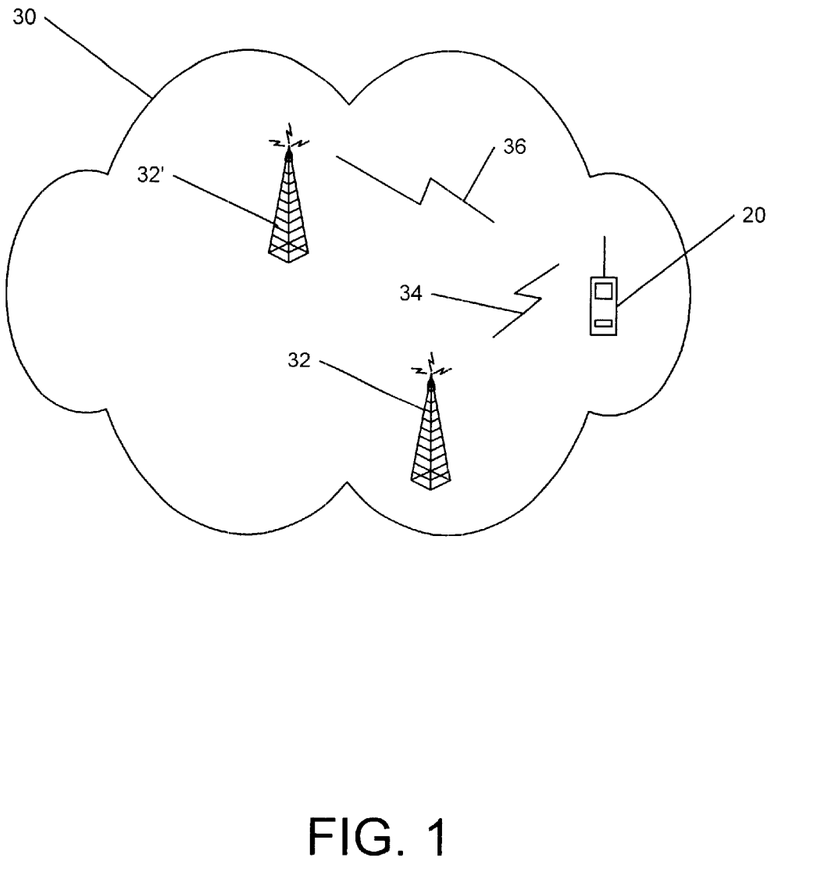
FIG. 1 is a schematic illustration of a mobile terminal including an embodiment of interference signal estimation located in a cellular wireless communication system.

Referring now to FIG. 1, mobile terminal 20 including interference signal power measurement capabilities according to an embodiment of the present invention is shown within the coverage area of a communications network 30. While the benefits of the present invention can be obtained in any signalling system where it is desired to measure the level of an interference signal or to generate a carrier to interference ratio, the typical application where such measurements are important is wireless communication channels which are generally more subject to signal impairment than wired communication or signal transmission lines. Accordingly, for the description herein and as illustrated in FIG. 1, the channels being measured by the interference signal power measurement systems and methods of the present invention are shown as wireless communication channels supported by a cellular wireless communication network 30. Furthermore, the signal measurement systems and methods of the present invention are illustrated as being included in a mobile terminal 20 This environment is particularly well suited to the benefits of the present invention which is typically addressed to overcoming problems which may be caused by movement of the mobile terminal 20. However, other sources, such as frequency offset between transmitting and receiving locations, can contribute to the problems which are addressed by the present invention. Accordingly, while in its preferred embodiments, the present invention is directed to mobile terminals making measurements in cellular communication networks, it is to be understood that the present invention may be beneficially applied in any type of network where interference ratio measurements are being made including wired and wireless environments and environments in which the receiving device making the measurements is not a mobile device. However, for the purposes of clarity in the remainder of this description, the present invention will be described in the context of a cellular wireless communication system such as an IS-136 standard system.

As shown in the illustration of FIG. 1, the wireless communication network 30 includes a plurality of base station antennas 32, 32'. While only two base station antennas are illustrated in FIG. 1, it is to be understood that the wireless communication network 30 typically will include numerous such base station antennas covering various regions within the network coverage area and further will include devices such as base station controllers and mobile switching offices. As shown in FIG. 1, the mobile terminal 20 is registered with the network 30 and being supported by the base station antenna 32 and is receiving transmissions from base station antenna 32 on downlink channel 34. However, while tuned to and receiving a signal on downlink channel 34, the mobile terminal 20 is also subject to interference signals such as an interference signal on downlink channel 36 of base station antenna 32' which is being picked up by the mobile terminal 20. In addition, while not shown in FIG. 1, the mobile terminal 20 is changing its location over time relative to the base station antenna 32.

Figure 2:
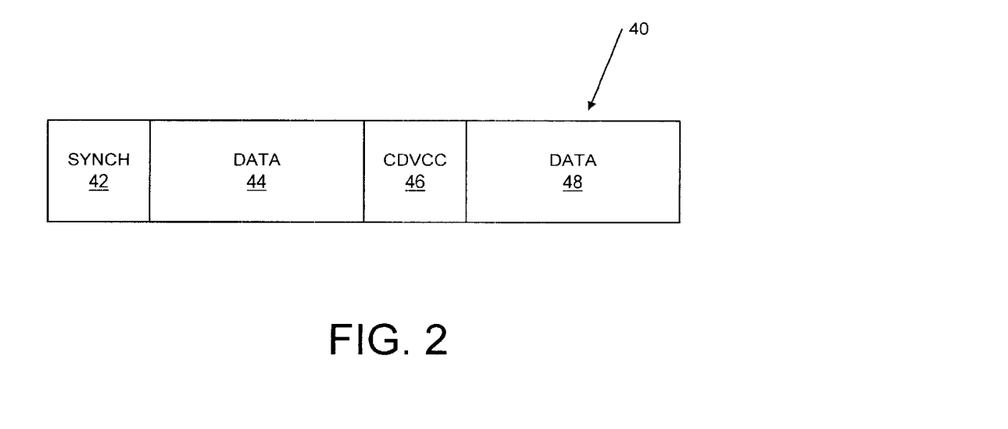
FIG. 2 is a schematic illustration of a downlink slot format such as that used in IS-136 networks and suitable for supporting interference signal power estimation according to the present invention.

Referring now to FIG. 2, an illustrative slot format for the downlink channel 34 will now be further described. For the illustrated embodiment, the wireless cellular communication network 30 is structured as a time division based network where a channel is specified as a particular slot (or slots) on a carrier frequency. Accordingly, transmissions are provided in bursts which are framed in a slot structure to accomplish the time division of the various communication frequencies. As shown in FIG. 2, each slot on the downlink channel 34 includes a synchronization (sync) field 42. For example, under the IS-136 specification, the sync field 42 is 14 symbols in duration. For the examples discussed further herein, the sync field will be assumed to conform with the IS-136 specification. The bit pattern of the symbols in the sync field 42 is a known pattern which is utilized by the receiving mobile terminal 20 to synchronize and lock on to the downlink channel 34.

The synchronization field 42 is followed by a data field 44 and a data field 48 each of which contain transmitted signals which are typically encoded symbols which are decoded by the receiving mobile terminal 20 and digitized to support various communication functions such as voice communications or data transmission. Also shown in the downlink slot format of FIG. 2 is a Coded Digital Verification Color Code (CDVCC) field 46 which is used to verify the identity of the base station to which the mobile terminal is connected. Different base stations transmitting on the same frequency typically use different CDVCCs.

Figure 3:
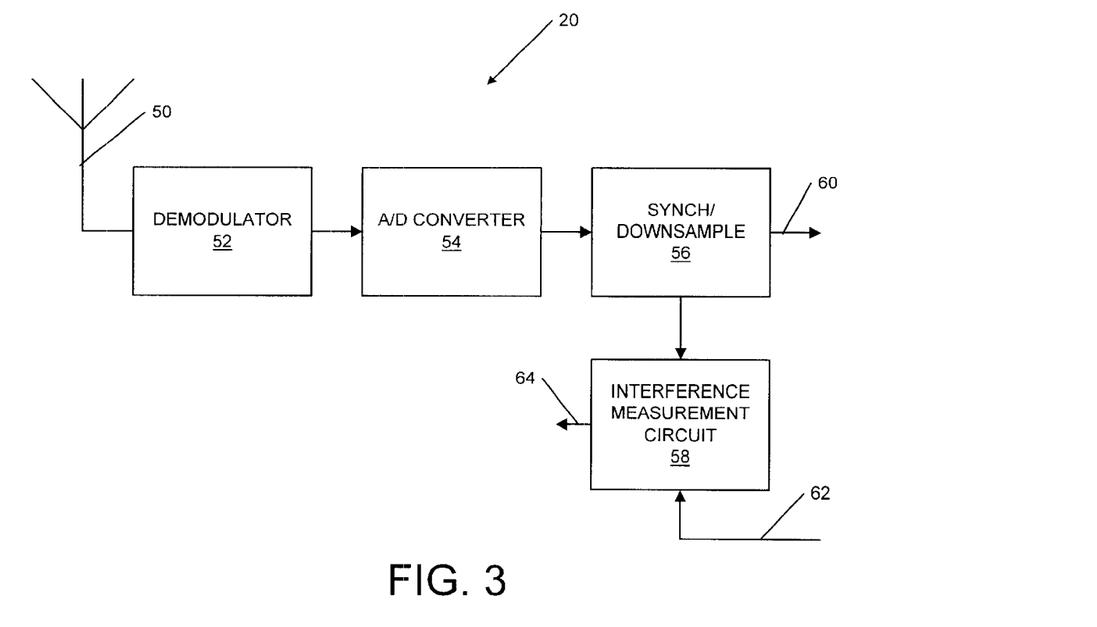
FIG. 3 is a block diagram of a mobile terminal including interference signal measurement means according to an embodiment of the present invention.

Referring now to FIG. 3, an embodiment of the mobile terminal 20 will be further described with reference to the block diagram illustration. The mobile terminal 20 includes an antenna 50 which receives signals including the downlink channel 34. The received signals from antenna 50 are provided, in turn, to demodulator 52 which may be an RF/IF receive and step down demodulator suitable for use in a mobile cellular telephone. A signal s(t) transmitted from base station antenna 32 on downlink channel 34 is received at antenna 50 as a received signal r(t) and demodulated by demodulator 52 and digitized at a first sample rate by analog to digital (A/D) converter 54. For example, in an IS-136 system, the analog to digital conversion and synchronization functions may be performed at a 194.4 ksymbols per second rate.

The converted and synchronized signal from A/D converter 54 is then further down sampled to a symbol rate by sync/downsampler 56. For example, in an IS-136 system, the symbol rate may be 24.3 ksymbols per second coming out of sync/downsampler 56. The down sampled digital symbol rate signal 60 is typically further provided to a decoder and other circuitry (not shown), such as a deinterleaver, to decode and extract the original transmitted data from the received signal r(t).

Also shown in FIG. 3 is interference measurement circuit 58. Interference measurement circuit 58 receives the down sampled received signals $r_i$ from sync/downsampler 56. Interference measurement circuit 58 further receives a plurality of associated expected symbols 62 from circuitry of the mobile terminal 20 which is not illustrated in FIG. 3. For example, where the synchronization window 42 is used as the period of time for sampling in generating an interference power estimate, the associated expected symbols may be the symbols from a known synchronization pattern which is stored in a memory of mobile terminal 20. Where the present invention is applied to demodulation based methods, the associated plurality of symbol estimates 62 may correspond to demodulated and decoded bits generated by the mobile terminal 20 which are considered to be of sufficient confidence as estimates that they may be treated as known symbols in applying the methods and systems of the present invention.

Accordingly, antenna 50 provides a means for receiving a plurality of symbols over the downlink channel 34 over a period of time, such as the synchronization window 42 of a downlink slot 40. The received plurality of symbols are subjected to various impairment signals such as an interference signal from downlink channel 36 or other noise or interference sources. As used herein, all such impairment signals will generally be referred to as "interference signals" except where interference and other noise effects are specifically identified separately. The received symbols may also be subject to fading. Accordingly, the received signal r(t) is generally characterized by the following relationship:

$$r(t)=cs(t)+I(t) \qquad (1)$$

where r(t) is the received signal, c is the channel response (related to fading effects), s(t) is the signal transmitted and I(t) generally represents interference signals.

After downsampling to the symbol rate, the signal provided by sync/downsampler 56 to interference measurement circuit 58 may be represented by the following equation:

$$r_i=cs_i+I_i \qquad (2)$$

where $r_i$ is the received signal for the ith symbol period, c is the channel estimate, $s_i$ is the transmitted symbol for the ith symbol period, and $I_i$ is the interference component for the ith symbol period. For the embodiment in which the sync window 42 of an IS-136 formatted down link slot 40 is used for generation of interference power estimates, i ranges from 0 to 13 corresponding to the 14 symbol periods in the sync window 42. The corresponding carrier to interference ratio measurement is represented by the following expression:

$$\frac{E\{|cs_i|^2\}}{E\{|I_i|^2\}} \qquad (3)$$

where E{ } denotes the average value. This value can be determined by using the received signals $r_i$ and the known expected synchronization symbols $s_i$ to generate an estimate of c. More particularly, according to the teachings of the present invention, a channel estimate c is derived which varies over the period of time of the calculation (i.e., the synchronization window 42 for the illustrative example). Once the time varying channel estimate c is determined, it may be used to calculate the interference and signal plus interference powers which, in turn, may be used to generate the carrier to interference ratio.

Accordingly, the demodulator 52 provides a means for receiving a plurality of symbols over the channel over a period of time such as the synchronization window 42. The demodulator 52 provides a means for demodulating the received symbols to provide an associated plurality of symbol estimates for the period of time. More particularly, the demodulator 52, A/D converter 54 and sync/downsampler 56 in combination generate an associated plurality of symbol estimates on a symbol rate basis.

The interference measurement circuit 58, in turn, provides a means for comparing the plurality of symbol estimates from the sync/downsampler 56 to the plurality of associated expected symbols 62 to generate a channel estimate which varies over the sampling period of time (such as the sync window 42). The interference measurement circuit 58 further provides a means for generating the interference signal strength 64 for the down link channel 34 using the derived channel estimate.

As will be appreciated by those of skill in this art, the above-described aspects of the present invention in FIG. 3 may be provided by hardware, software, or a combination of the above. While various components of mobile terminal 20 have been illustrated in FIG. 3, in part, as discrete elements, they may, in practice, be implemented by a processor, such as a microcontroller, including input and output ports and running software code, by custom or hybrid chips, by discrete components or by a combination of the above. For example, the interference measurement circuit 58 may be contained within a processor (not shown) supporting other communications functions of the mobile terminal 20.

Operations of the present invention will now be described with respect to FIGS. 4, 5 and 6. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 4:
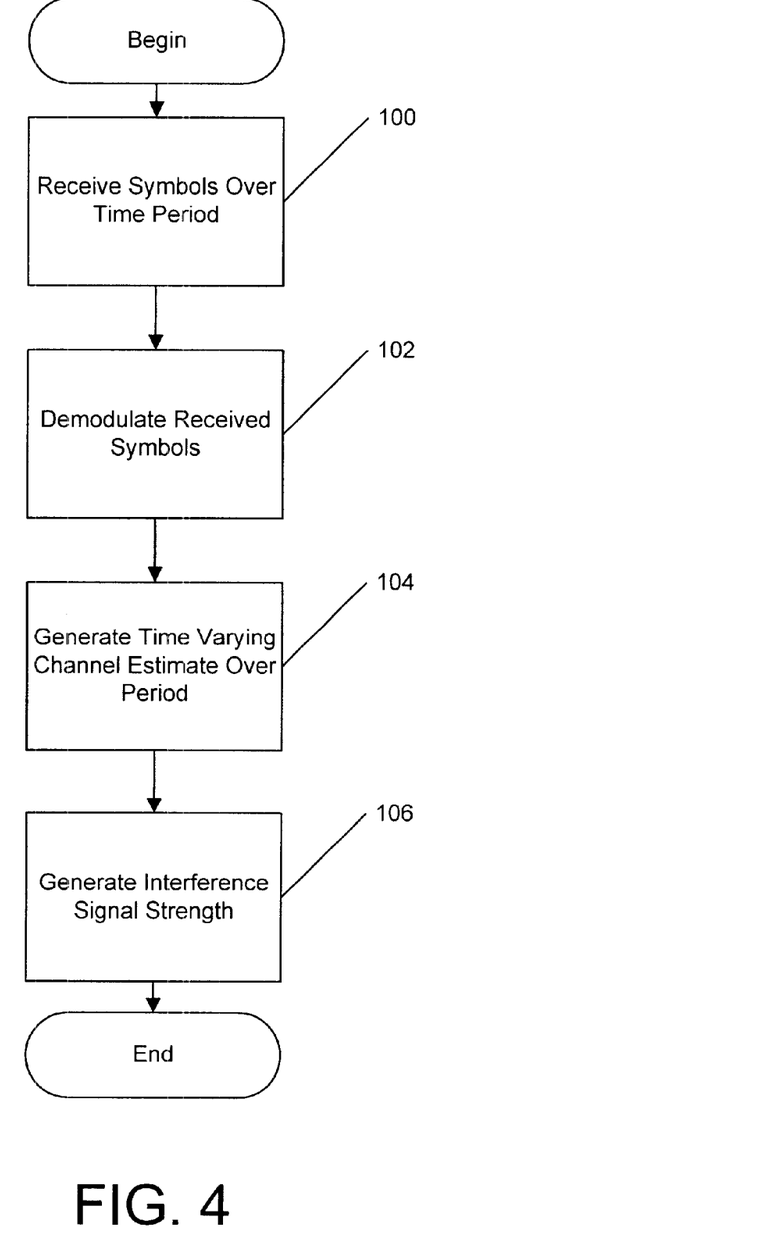
FIG. 4 is a flowchart illustrating operations for an embodiment of the present invention.

Referring first to the embodiment of FIG. 4, operations being at block 100 when mobile terminal 20 receives a plurality of symbols while monitoring the down link channel 34 over the measurement period. The measurement period may be the synchronization window 42 of the down link slot 40. The received symbols are then demodulated by the mobile terminal 20 to provide an associated plurality of symbol estimates for the period of time (block 102). The mobile terminal 20 then compares the plurality of symbol estimates to a plurality of expected symbols, such as the known synchronization symbol sequence, to generate a channel estimate which varies over the period of time (block 104). An interference signal strength is then generated by the mobile terminal 20 for the channel using the generated channel estimate (block 106).

Various approaches to generating a time varying channel estimate at block 104 may be applied. In one embodiment, a time varying function is defined for the channel estimate which includes a plurality of coefficients. Preferably, a linear time varying function of the form $c=c^0+c^1 t$ is defined for the channel estimate. An estimate for each of the plurality of coefficients $c^0$, $c^1$ is then generated based on the plurality of symbol estimates and the plurality of associated expected symbols.

In a further embodiment, operations at block 104 include partitioning the time period, such as the synchronization window 42, into a plurality of estimation windows. A constant channel estimate $c_i$ is then generated for each of the plurality of estimation windows and the constant channel estimates are each associated with a symbol position in the middle region of the respective estimation window associated with the constant channel estimate. For example, with the 14 symbol length synchronization window 42 as the time period, 10 different sub sample periods (estimation windows) may be provided. The first estimation window incorporates $r_0$–$r_4$ to generate a channel estimate for the second symbol period $c_2$. The second sub-sample estimation window is then chosen as $r_1$–$r_5$ with the resulting constant channel estimate assigned to the third symbol $c_3$ and so on through the final estimation window utilizing received symbols $r_9$–$r_{13}$ to provide an associated channel estimate for the $11^{th}$ symbol period $c_{11}$.

In this embodiment, the subsequent calculations apply the data from symbol period 2 through 11 rather than the full 0 through 13 of the synchronization window 42. However, an improved channel estimate may be provided for time varying channel conditions as the constant approximation technique typically provides best fit results at a mid point in the estimation period. Therefore, using the five symbol period windows and associating the result and constant value only with the center symbol may provide improved fit of the resulting channel estimate. Furthermore, while within each estimation window the channel estimate is a constant value, it still varies with time over the synchronization window 42.

Figure 5:
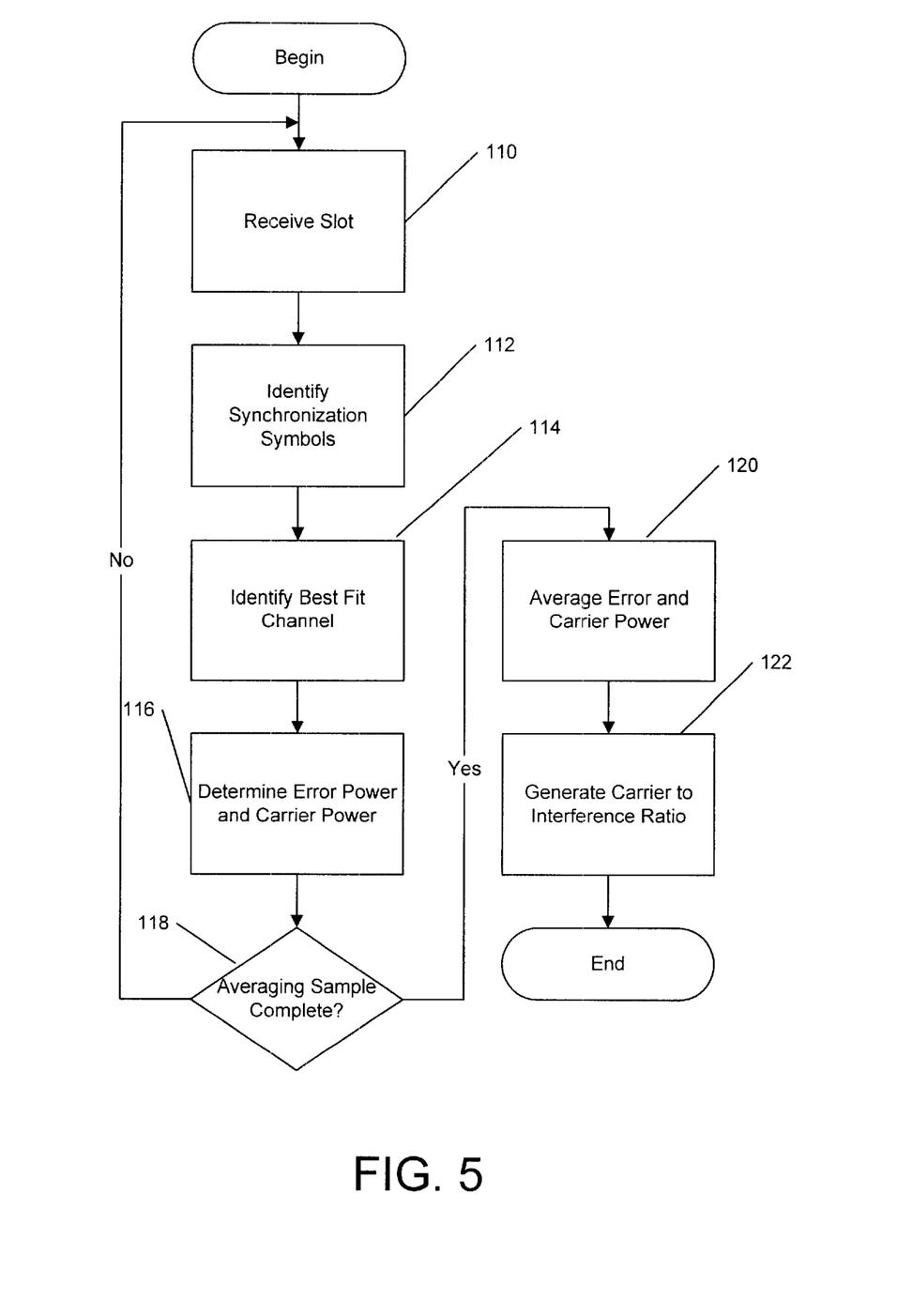
FIG. 5 is a flowchart illustrating operations for a further embodiment of the present invention.

Referring now to FIG. 5, operations for an embodiment of the present invention corresponding to the first embodiment using a function of the form $c=c^0+c^1 t$ will now be further described. In the embodiment of FIG. 5, the time varying channel estimate is generated using a time varying function and a least mean squares fit over the entire synchronization window time period. A first down link slot 40 including a synchronization window 42 is received by the mobile terminal (block 110). The synchronization symbols from the synchronization window 42 are then identified from the received slot 40 (block 112). A best fit channel estimate is then identified by the mobile terminal 20 (block 114). Preferably, a linear time varying function is used in generating the best fit channel estimate in the form $c=c^0+c^1 t$. This estimate is solved for each symbol period 0 through 13 in the embodiment of an IS-136 system. The best fit channel may be identified as will be described further late herein.

The error (interference) power and signal (carrier) power are then determined using the best fit channel estimate from block 114 (block 116). The error power estimate may be generated pursuant to the following equation:

$$P(I_i) = |r_i - c_i s_i|^2 \qquad (3a)$$

$$= \frac{1}{z} \sum_{0}^{13} |r_i - c^0 s_i - c^1 i s_i|^2 \qquad (3b)$$

where z is the scaling factor to adjust the power to a per symbol basis allowing for bias in the error measurement.

Furthermore, in the embodiment of FIG. 5, to improve the generated error and signal power information used in generating the carrier to interference ratio value, the measurements are averaged over a plurality of received slots to provide greater accuracy in predictions albeit at the cost of acquiring a greater number of received slots to generate an updated estimate. Accordingly, at block 118, if the selected slot sample size has not been completed, operations return to block 110 to receive an additional slot and then operations continue as previously described from blocks 112 through 118 until the desired number of samples have been taken from different received slots 40. Operations then move to block 120 where the accumulated error power and carrier power estimates are averaged to provide an average error and carrier power estimate. A carrier to interference ratio value is then generated from the average error and carrier powers (block 122).

Figure 6:
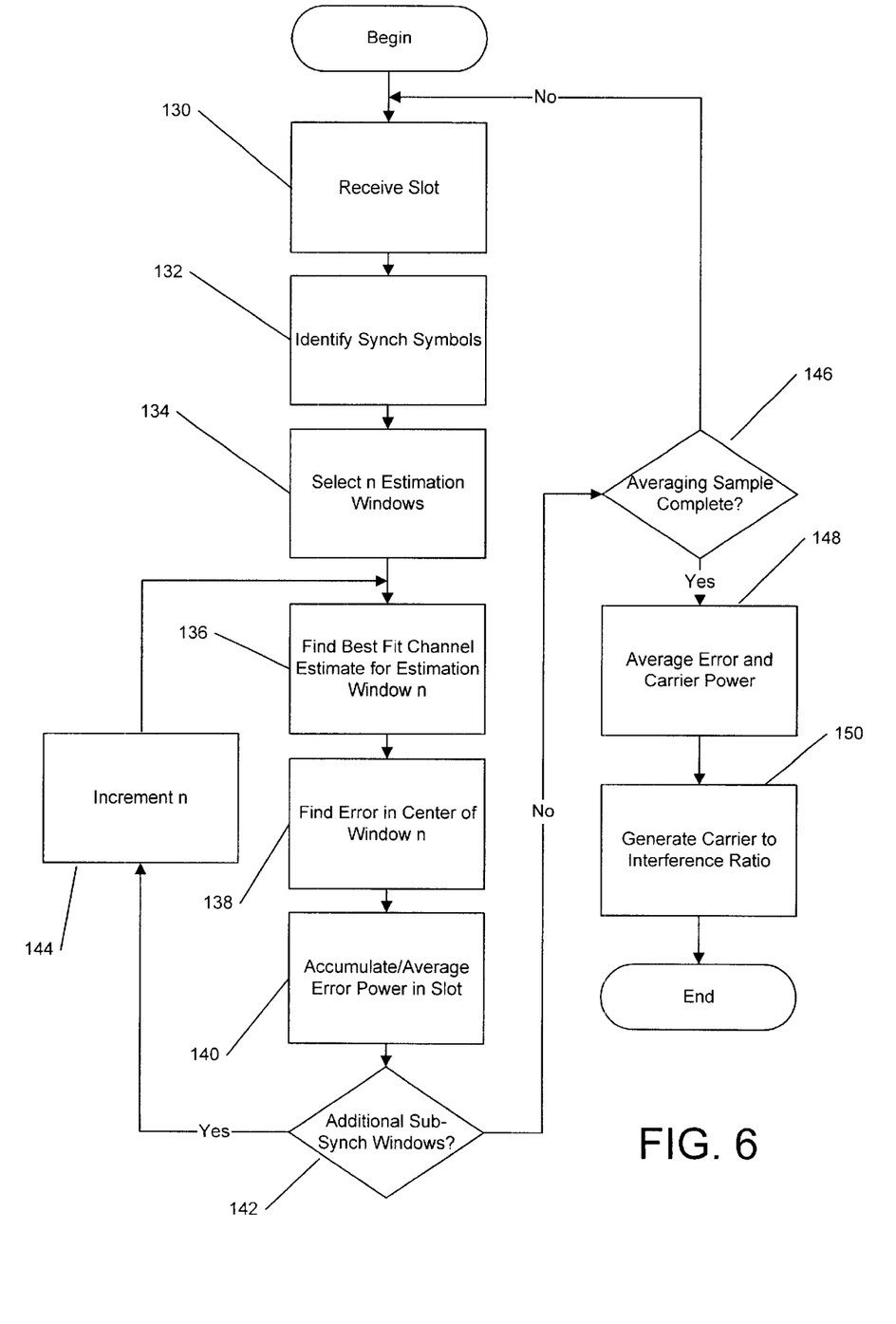
FIG. 6 is a flowchart illustrating operations for another embodiment of the present invention.

Referring now to FIG. 6, operations for an embodiment of the present invention, corresponding to the embodiment described above in which partitioning of the synchronization window into a plurality of estimation windows is provided, will be further described. A first downlink slot 40 including a synchronization window 42 is received by the mobile terminal (block 130). The synchronization symbols from the synchronization window 42 are then identified from the received slot 40 (block 132). A total of n sub-sync estimation windows are then selected from within the synchronization window 42 (block 134).

A best fit channel estimate is then identified by the mobile terminal 20 for the first estimation window (block 136). The best fit channel estimate is determined as a constant estimate for the estimation window with the resulting constant channel estimate value associated with the center symbol period of the first sub-sync estimation window.

The error power is then determined for the symbol period in the center of the first estimation window using the constant channel estimate from block 136 (block 138). The calculated error power is then accumulated for use in averaging estimates over a plurality of received slot samples as will be further described (block 140). If it is determined at block 142 that additional estimation windows have been selected and require calculations for the received slot, operations move to block 144 where n is incremented to the next estimation window. Operations then return to block 136 and repeat as described previously for blocks 136–142 for each subsequent estimation window until no additional estimation windows remain.

Operations then move to block 146 to determine if the selected slot sample size has been completed. As with the embodiment described in FIG. 5, this may allow improved generation of error and carrier power information by averaging measurements over a plurality of received slots to provide greater accuracy in predictions, albeit at the cost of acquiring a greater number of received slots to generate an updated estimate. Operations then move to block 148 where the accumulated error power and carrier power estimates are averaged to provide an error average and signal power estimate. A carrier to interference ratio value is then generated from the average error and carrier powers (block 150).

In the description above, the matrix nature of the calculations has been simplified. Accordingly, the embodiments of FIG. 5 and FIG. 6 will now be further described. In the embodiment of FIG. 5, the channel is allowed to be time-varying over the sync window 42, but is constrained to have a linear ($1^{st}$ order) variation. In other words, the channel is assumed to be of the form:

$$c_i 32 \ c^0 + c^1 i, i=0, \ldots 13 \tag{4}$$

where $c_i$ is the channel response at symbol position i and $c^0$ and $c^1$ are the best fit coefficients over the synch window 42.

The least squares estimate of the channel over the sync window 42, $\tilde{c}_i$, can be found using the method explained below. Initially:

$$r = Sc + w, \tag{5}$$

where r is the received signal, c is the channel response, w is the interference signal and:

$$S = \begin{pmatrix} s_0 & 0 \\ s_1 & s_1 \\ s_2 & 2s_2 \\ \vdots & \vdots \\ s_{13} & 13s_{13} \end{pmatrix} \tag{6}$$

where $s_i$ are the transmitted signal, i.e., the associated expected symbols 62 of the synchronization pattern and:

$$c = [c^0 c^1]^T \tag{7}$$

The least squares estimate of c, i.e., $\tilde{c}$ is obtained using:

$$\tilde{c} = (S^H S)^{-1} S^H S \tag{8}$$

where $S^H$ is the Hermitian transpose of the S matrix.

The error sequence is given by:

$$\hat{e}_i = r_i - \tilde{c}_i s_i \tag{9}$$

where $\hat{e}$ is the error estimate.

The interference and carrier powers can then be calculated using known techniques.

In the embodiment of FIG. 6, overlapping estimation windows are used. As described above, the channel estimate calculated is assumed to be accurate only for the center symbol of the estimation window, and the error is calculated only at this position for this estimation window. Estimation windows of odd lengths are chosen. It can be further appreciated by those of skill in the art that a window of an even length could also be chosen with the center two symbols of the estimation window being used for calculating the error. Next, the starting position of the estimation window is shifted by one symbol, and another error value for the center position of the new estimation window is calculated. In other words:

$$\hat{c}_k = \frac{1}{2L+1} \sum_{i=k-L}^{k+L} r_i s_i^* \tag{10}$$

where k is the symbol index for which the channel estimate is calculated. It is to be appreciated that k varies over a length that is shorter than the length of the synchronization sequence. 2L+1 is the window size used. Furthermore:

$$E = \frac{1}{Z_1} \sum_{k=L}^{13-L} |r_k - c_k s_k|^2 \tag{11}$$

where E is indicative of the power of the impairment.

Note that under either method the signal plus impairment power may be calculated using an evaluation over the whole slot 40 (instead of just the sync window 42). It may then be averaged over the respective lengths to a per symbol basis before calculating the signal to impairment (carrier to interference) ratio. In addition, two separate time periods may be used including, for example, one time period corresponding to the synchronization window and a second time period within the frame, offset from the first time period. The methods of the present invention may be applied to both windows and the results combined to provide the carrier to interference ratio, for example, by averaging. Alternatively, the methods of the present invention may be applied to the first time period and conventional techniques may be used over the entire frame or a portion of the frame other than the first time period (synchronization) window and the results averaged to provide the carrier to interference ratio. These alternative approaches may allow improved detection of interference sources which are only intermittent and not detected during the first time period. Furthermore, it can be appreciated that the signal to impairment ratio can be calculated from the carrier to impairment power (where the carrier power is defined as signal plus impairment power) as follows:

$$\frac{S}{I} = \frac{(S+I)}{I} - 1 \tag{11a}$$

The techniques described above may involve the estimation of the channel using noisy data, and the calculation of the error using a resulting noisy channel estimate. In this case, it is found that the variance of the error signal may not be the true variance of the impairment, but rather a biased version of it. The bias calculation to generate the appropriate scaling factor z which allows for bias will now be described.

The vector of received signal samples may be characterized as:

$$r = Sc + w, \tag{12}$$

where S is a n×m matrix, c is a m×1 vector, and the other quantities are n×1 vectors. S is assumed full rank, and m<n. Note that:

$$E\{ww^H\} = \sigma_n^2 I \tag{13}$$

where $\sigma_n$ is the standard deviation of the noise and I is the identity matrix which is the assumption of white noise. This model is general enough to handle cases with intersymbol interference (ISI), and time-varying channels over the sync window 42. The least squares channel estimate is given by:

$$\tilde{c} = (S^H S)^{-1} S^H r \tag{14}$$

The error signal vector is then given by:

$$e = r - S\tilde{c} \tag{15}$$

-continued $$= Sc + w - S(S^H S)^{-1} S^H r \quad (16)$$

$$= Sc + w - Sc - S(S^H S)^{-1} S^H w \quad (17)$$

$$= (I - S(S^H S)^{-1} S^H) w \quad (18)$$

The power in the error sequence is given by:

$$E\{e^H e\} = E\{w^H (I - S(S^H S)^{-1} S^H)^H (I - S(S^H S)^{-1} S^H) w\} \quad (19)$$

$$= E\{w^H (I - S(S^H S)^{-1} S^H) w\} \quad (20)$$

It can be shown that the matrix $S(S^H S)^{-1} S^H$ has m eigenvalues equal to unity and the rest equal to zero. Assuming:

$$S(S^H S)^{-1} S^H = U^H \Lambda U \quad (21)$$

where U is unitary and $\Lambda$ is diagonal and m diagonal entries equal to one with the rest zero, we have:

$$E\{e^H e\} = E\{w^H U^H \Lambda_1 U w\} \quad (22)$$

where $\Lambda_1$ is a diagonal matrix with N–M diagonal elements equal to 1 and the rest zero. Since U is a unitary matrix, we have $$E\{e^H e\} = E\{v^H \Lambda_1 v\} \quad (23)$$

$$v = U w \quad (24)$$

$$E\{v v^H\} = \sigma_n^2 I \quad (25)$$

Thus, we have:

$$E\{e^H e\} = (N-M) \sigma_n^2 \quad (26)$$

Note that with perfect knowledge of the channel and the symbols, a noise power of $N\sigma_n^2$ may be obtained. Thus, a bias can be found in the estimated noise variance when least squares channel estimation is used.

The above result can be arrived at through an alternative interpretation. Basically, the least squares method projects the received signal along the dimensions of the signal matrix S. When this is done, the component of the noise in these dimensions is factored in also. Thus, when the residual error is calculated, the portion of the noise in the signal dimension is lost. With uniform noise, this works out to $M\sigma_n^2$.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for estimation of interference on a communication channel comprising the steps of:
    receiving a signal over the channel over a period of time within a single received slot;
    demodulating the received signal to provide an associated plurality of symbol estimates for the period of time;
    comparing the plurality of symbol estimates to a plurality of associated expected symbols to generate a channel estimate which accounts for variation of the channel over the period of time; and
    generating an estimate of interference signal strength for the channel using the channel estimate and the signal received over the period of time.

2. A method according to claim 1 wherein the comparing step comprises the steps of:
    defining a time varying function for the channel estimate, the time varying function including a plurality of coefficients; and
    estimating each of the plurality of coefficients based on the plurality of symbol estimates and the plurality of associated expected symbols.

3. A method according to claim 2 further comprising the steps of:
    repeating the steps of receiving, demodulating, comparing and generating for a plurality of received slots;
    accumulating the generated interference signal strengths; and
    generating an average interference signal strength for the channel from the accumulated interference signal strengths.

4. A method according to claim 2 wherein the defining step comprises the step of defining a linear time varying function of the form $c = c^0 + c^1 t$ for the channel estimate where c is the channel estimate and $c^0$ and $c^1$ are coefficients of the channel estimate.

5. A method according to claim 2 wherein the generating step comprises the step of calculating the power of the interference signal to provide the interference signal strength using a function of the form $$P(I_i) = \frac{1}{z} \sum |r_i - c^0 s_i - c^1 i s_i|^2$$

where the summation is over the period of time and where $I_i$ is the interference signal, $r_i$ is a received signal, $s_i$ is an excepted signal, i is a symbol period and z is a scaling factor.

6. A method according to claim 5 wherein the period of time is the synchronization period of the received slot and the plurality of associated expected symbols are a predetermined synchronization sequence and wherein the calculating step further comprises the step of scaling the interference signal strength to a per symbol basis and wherein the summation is performed over the period of time on a symbol rate basis.

7. A method according to claim 5 wherein the channel is an IS-136 protocol channel and the synchronization period is fourteen symbols and the summation in the interference signal strength function is for i=0 to 13.

8. A method according to claim 6 further comprising the step following the generating step of determining a carrier to interference ratio for the channel using the interference signal strength.

9. A method according to claim 1 wherein said demodulating step is followed by the step of generating the plurality of associated expected symbols from decoded and then re-coded symbol estimates corresponding to symbol estimates for the period of time.

10. A method according to claim 1 wherein the channel is subject to time dispersion and the channel estimates comprise a first and a second channel estimate, each of which varies over the period of time, the first channel estimate being associated with the symbol position of the channel estimate and the second channel estimate being associated with a symbol position preceding the symbol position of the channel estimate.

11. A method according to claim 1 wherein the comparing step comprises the steps of:
    partitioning the period of time into a plurality of estimation windows;

generating a constant channel estimate ci for each of the plurality of estimation windows; and associating each of the constant channel estimates with a symbol position in a middle region of the respective estimation window associated with the constant channel estimate.

12. A method according to claim 11 further comprising the steps of:

repeating the steps of receiving, demodulating, comparing and generating for a plurality of received slots;

accumulating the generated interference signal strengths; and generating an average interference signal strength for the channel from the accumulated interference signal strengths.

13. A method according to claim 11 wherein each of the plurality of estimation windows overlaps at least one other of the plurality of estimation windows.

14. A method according to claim 11 wherein the generating step comprises the step of calculating the power of the interference signal to provide the interference signal strength using a function of the form $$P(I_i) = \frac{1}{Z_1} \sum |r_i - c_i s_i|^2$$

where the summation is over the period of time and where $I_i$ is the interference signal, $r_i$ is a received signal, $s_i$ is an excepted signal, i is a symbol period and z is a scaling factor.

15. A method according to claim 14 wherein the period of time is the synchronization period of the channel and the plurality of associated expected symbols are a predetermined synchronization sequence and wherein the calculating step further comprises the step of scaling the interference signal strength to a per symbol basis.

16. A method according to claim 15 wherein the channel is an IS-136 protocol channel and the synchronization period is fourteen symbols and wherein the summation in the interference signal strength function is for i=2 to 11.

17. A method according to claim 16 wherein each of the plurality of estimation windows is an odd symbol length estimation window having a center symbol position and the associating step comprises the step of associating each of the constant channel estimates with the central symbol position in the estimation window associated with the constant channel estimate.

18. A method according to claim 11 further comprising the step following the generating step of determining a carrier to interference ratio for the channel using the interference signal strength.

19. A method according to claim 11 further comprising the step following said demodulating step of generating the plurality of associated expected symbols from decoded and then re-encoded symbol estimates corresponding to symbol estimates for the period of time.

20. A method according to claim 11 wherein the channel is subject to time dispersion and the channel estimates comprise a first and a second channel estimates for each of the plurality of estimation windows, the first channel estimate being associated with the symbol position of the channel estimate and the second channel estimate being associated with a symbol position preceding the symbol position of the channel estimate.

21. A method according to claim 1 wherein the period of time is the synchronization period of a received slot and further comprising the steps of:

demodulating the received signal to provide a second associated plurality of symbol estimates for a portion of the received slot not included in the period of time;

determining a second interference signal strength based on the plurality of symbol estimates for the portion of the received slot; and wherein the generating step comprises the step of generating an estimate of interference signal strength for the channel using the second interference signal strength, the channel estimate and the signal received over the time period.

22. A method according to claim 21 wherein the generating step comprises the step of generating an interference signal strength by averaging the second interference signal strength and an interference signal strength computed using the channel estimate and the signal received over the time period.

23. A system for estimation of interference on a communication channel, the system comprising:

means for receiving a signal over the channel over a period of time within a single received slot;

means for demodulating the received signal to provide an associated plurality of symbol estimates for the period of time;

means for comparing the plurality of symbol estimates to a plurality of associated expected symbols to generate a channel estimate which accounts for variation of the channel over the period of time; and means for generating an estimate of interference signal strength for the channel using the channel estimate and the signal received over the period of time.

24. A system according to claim 23 wherein the means for comparing comprises:

means for defining a time varying function for the channel estimate, the time varying function including a plurality of coefficients; and means for estimating each of the plurality of coefficients based on the plurality of symbol estimates and the plurality of associated expected symbols.

25. A system according to claim 23 wherein the means for comparing comprises:

means for partitioning the period of time into a plurality of estimation windows;

means for generating a constant channel estimate $c_i$ for each of the plurality of estimation windows; and means for associating each of the constant channel estimates with a symbol position in a middle region of the respective estimation window associated with the constant channel estimate.

26. The system of claim 24 wherein the means for defining a time varying function for the channel estimate comprises means for defining a linear time varying function of the form $c=c^0+c^1 t$ for the channel estimate, where c is the channel estimate and $c^0$ and $c^1$ are coefficients of the channel estimate.

27. A system for estimation of interference on a communication channel, the system comprising:

a demodulator configured to receive a signal over the channel over a period of time within a single received slot and to demodulate the received signal to provide an associated plurality of symbol estimates for the period of time; and an interference measurement circuit configured to compare the plurality of symbol estimates to a plurality of associated expected symbols to generate a channel estimate that accounts for variation of the channel over the period of time and to generate an estimate of interference signal strength for the channel using the channel estimate and the signal received over the period of time.

28. The system of claim 27 wherein the interference measurement circuit is further configured to partition the period of time into a plurality of estimation windows, to generate a constant channel estimate $c_i$ for each of the plurality of estimation windows and to associate each of the constant channel estimates with a symbol position in a middle region of the respective estimation window associated with the constant channel estimate.

29. The system of claim 27 wherein the interference measurement circuit is further configured to define a time varying function for the channel estimate, the time varying function including a plurality of coefficients, and to estimate each of the plurality of coefficients based on the plurality of symbol estimates and the plurality of associated expected symbols.

* * * * *